United States Patent [19]

Utagawa et al.

[11] 4,297,571
[45] Oct. 27, 1981

[54] FOCUS DETECTING DEVICE

[75] Inventors: Ken Utagawa, Yokohama; Kunihisa Hoshino; Hiroshi Shirasu, both of Kawasaki; Akira Ogasawara, Yokohama, all of Japan

[73] Assignee: Nippon Kogaku K.K., Tokyo, Japan

[21] Appl. No.: 109,282

[22] Filed: Jan. 3, 1980

[30] Foreign Application Priority Data

Jan. 20, 1979 [JP] Japan ................. 54-5269

[51] Int. Cl.$^3$ .............................. G01J 1/20
[52] U.S. Cl. ............................ 250/201; 250/204
[58] Field of Search ............. 250/201, 204, 208, 209, 250/578; 354/25; 356/4, 141, 152

[56] References Cited

U.S. PATENT DOCUMENTS

| | | | |
|---|---|---|---|
| 3,875,401 | 4/1975 | Stauffer | 250/209 |
| 4,083,056 | 4/1978 | Nakamura et al. | 354/25 |
| 4,250,376 | 2/1981 | Joseph et al. | 250/201 |

*Primary Examiner*—David C. Nelms
*Attorney, Agent, or Firm*—Fitzpatrick, Cella, Harper & Scinto

[57] ABSTRACT

In a focus detecting device having a first and second photoelectric element arrays each including a plurality of photo-electric elements disposed so as to mutually correspond in position and optical means for forming a first image and a second image of an object on the first and second arrays, respectively, there is provided first means for calculating the differences between electrical outputs related to the outputs of the mutually corresponding ones of the photoelectric elements of the first and second arrays and adding together the quantities based on said differences, second means for calculating the difference between each electrical output related to the output of each of the photoelectric elements and each electrical output related to the output of the photoelectric element spaced apart from each photoelectric element with a predetermined number of photoelectric elements interposed therebetween in the direction of arrangement of the elements of the arrays and adding together the quantities based on said differences, and third means for detecting the focused condition of the objective lens on the basis of the outputs of said first means and said second means.

4 Claims, 4 Drawing Figures

FOCUS DETECTING DEVICE

BACKGROUND OF THE INVENTION

1. Field of the Invention

This invention relates to a focus detecting device.

2. Description of the Prior Art

The focus detecting device disclosed, for example, in Japanese Laid-open Patent Application No. 39543/1975 (Japanese Patent Application No. 68068/1974) corresponding to U.S. application Ser. No. 377,809 (filed on July 9, 1973) is one in which the optical images of an object are formed on a pair of photoelectric element arrays and the differences between the photoelectric outputs of photoelectric elements located at corresponding positions on the two photoelectric element arrays are taken out, whereafter a correlated output is obtained as the sum of the absolute values of the differences and the focused condition of an objective lens is detected from the minimum value of the correlated output. According to this method, however, the correlated output is not standardized and therefore, it assumes various waveforms depending on the brightness distribution of the object to be focused, as indicated by solid line and broken line in FIG. 4 of the accompanying drawings. Accordingly, in order to detect the focused condition, it is necessary to move the objective lens at least once from the shortest distance to infinity.

SUMMARY OF THE INVENTION

It is the object of the present invention to provide a focusing detecting device which is capable of detecting the focused condition for any object by standardizing the correlated output.

The invention will become fully apparent from the following detailed description thereof taken in conjunction with the accompanying drawings.

DESCRIPTION OF THE PREFERRED EMBODIMENTS

An embodiment of the present invention will hereinafter be described.

Figure 1:
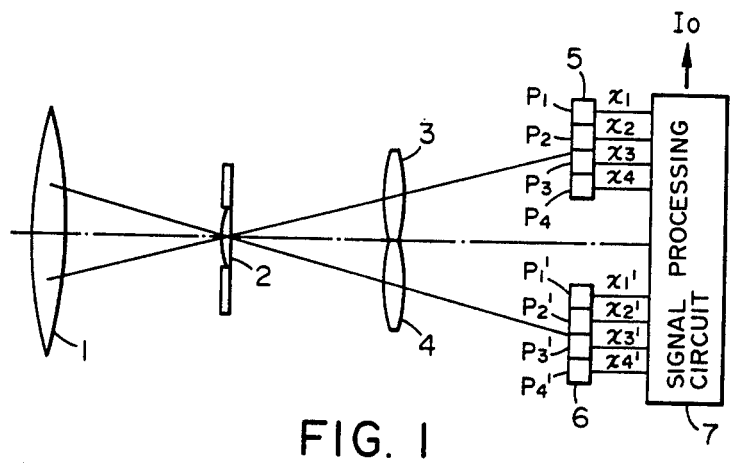
FIG. 1 is a schematic view for illustrating the principle of the present invention.

Referring to FIG. 1, a field lens 2 is provided in the fixed focal plane of an objective lens 1 or in a plane conjugate therewith. In a camera or the like, a film is disposed in the fixed focal plane and therefore, the light path of the objective lens 1 is divided and the field lens 2 is provided in the divided light path. Photoelectric element arrays 5 and 6 are provided at positions conjugate with the field lens 2, namely, the fixed focal plane of the lens 1, with respect to re-imaging lenses 3 and 4. In this example, the arrays 5 and 6 respectively comprise four photoelectric elements $P_1-P_4$ and $P_1'-P_4'$. The positional relations between the re-imaging lenses 3, 4 and the arrays 5, 6 are determined so that when the objective lens 1 is focused to an object, namely, when the image of an object by the lens 1 is formed on the field lens 2, the positional relations between the images of the object formed on the photoelectric element arrays 5 and 6 by the objective lens 1 and re-imaging lenses 3, 4 and the corresponding arrays 5, 6 are identical. Accordingly, during the focused condition the intensities of light incident on the positionally corresponding photoelectric elements ($P_1$ and $P_1'$) ... ($P_4$ and $P_4'$) of the pair of photoelectric element arrays 5, 6 are equal. Also, when the image of the object by the objective lens 1 is formed forwardly of the field lens 2 (namely, during the forward focusing), the image on the photoelectric element array 5 moves downwardly while the image on the photoelectric element array 6 moves upwardly and conversely, when the image by the objective lens 1 is formed rearwardly of the field lens 2 (namely, during the rearward focusing), the images on the photoelectric element arrays 5 and 6 move in the directions opposite to those in the case of the forward focusing. If the photoelectric outputs from the photoelectric elements $P_1-P_4$ or the electrical outputs related thereto are $x_1-x_4$ and the photoelectric outputs from the photoelectric elements $P_1'-P_4'$ or the electrical outputs related thereto are $x_1'-x_4'$, these photoelectric outputs are applied to a signal processing circuit 7. The processing circuit 7 obtains the following correlations $I_N$ and $I_D$ from these photoelectric outputs.

$$I_N = |x_1 - x_1'| + 2|x_2 - x_2'| + 2|x_3 - x_3'| + |x_4 - x_4'| \quad (1)$$

$$I_D = |x_1 - x_2| + |x_2 - x_3| + |x_3 - x_4| + |x_1' - x_2'| + |x_2' - x_3'| + |x_3' - x_4'| \quad (2)$$

If a standardized correlated function $I_O = I_n/I_D$ is sought after from these two, $I_O = 0$ from $I_N = 0$ because, as already noted, $x_1 = x_1'$, $x_2 = x_2'$, $x_3 = x_3'$ and $x_4 = x_4'$ during the focusing of the objective lens 1.

Also, when the focused condition shifts to the forward focusing so that the images on the two arrays are displaced and the relative position thereof is deviated by an amount corresponding to one photoelectric element, $x_2 = x_1'$ $x_3 = x_2'$ and $x_4 = x_3'$ are established and, when the focused condition shifts to the rearward focusing so that the relative position of the images on the two arrays is deviated by an amount corresponding to one photoelectric element, $x_2' = x_1$, $x_3' = x_2$ and $x_4' = x_3$ are established and therefore, at this time, $I_N = I_D$ and $I_O = 1$.

Figure 2:
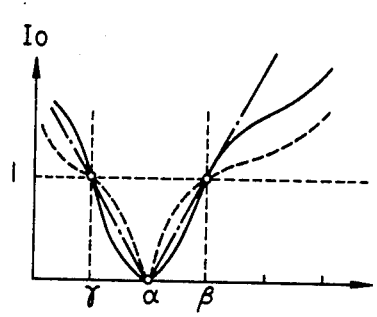
FIG. 2 is a graph showing the correlated output for the position of the objective lens standardized by the present invention.
Figure 4:
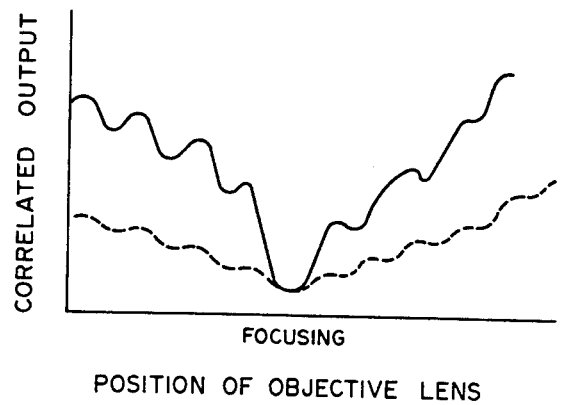
FIG. 4 is a graph in which the correlated output for the position of the objective lens is plotted.

Thus, whatever brightness distribution the object may have, or whatever brightness level the object may have, when the focused position of the objective lens is α as indicated by the solid lines, broken lines and dot-and-dash lines in FIG. 2, the correlated function, namely, the focused condition detection signal $I_O$ always becomes zero and in the case of the forward focusing γ or the backward focusing β where the relative positon of the images on the two arrays is deviated by an amount corresponding to one photoelectric element, $I_O$ always becomes 1. Accordingly, in the three conditions, namely, the forward focusing condition of a predetermined degree, the rearward focusing condition of a predetermined degree and the focused condition, the focused condition detection signal $I_O$ can be standardized. Consequently, for example, by determining a threshold value of a suitable level in the vicinity of 1 and comparing this threshold value with the correlated function $I_O$, the vicinity of the focused condition can be detected.

In the foregoing embodiment, each array comprises four photoelectric elements, but the correlations $I_O$ and $I_D$ in the case where each array comprises an arbitrary number of photoelectric elements will now be described.

If each array comprises N photoelectric elements and the photoelectric outputs of one array are $x_1; x_2, \ldots x_N$ and the photoelectric outputs of the other array are $x_1', x_2', \ldots, x_N'$, then $$I_N = |x_1 - x_1'| + b|x_2 - x_2'| + \sum_{j=3}^{n-2} c|x_j - x_j'| + b|x_{n-1} - x'_{n-1}| + |x_n - x_n'| \quad (3)$$

$$I_D = |x_1 - x_2| + \sum_{j=2}^{n-2} d|x_j - x_{j+1}| + |x_{n-1} - x_n| + |x_1' - x_2'| + \sum_{j=2}^{n-2} d|x_j' - x'_{j+1}| + |x'_{n-1} - x_n'| \quad (4)$$

where $b = 1 + d$, $c = 2d$ (5)

By so determining the correlations $I_D$ and $I_N$, $x_2' = x_1$, $x_3' = x_2, \ldots x_n' = x_{n-1}$ or $x_2 = x_1', x_3 = x_3', \ldots x_n = x'_{n-1}$ are established in the case of the rearward focusing or the forward focusing where each image is deviated by an amount corresponding to one photoelectric element, and therefore $I_N = I_D$ and $I_O$ becomes 1. In the case of the focused condition, $I_N = 0$ from $x_1 = x_1' \ldots x_n'$ and $I_O$ becomes zero.

Equations (1) and (2) are the cases where $N=4$, $d=1$, $b=2$ and $c=2$ in equations (3), (4) and (5). Of course, d, b and c are not limited to integers.

Also, equations (1), (2), (3) and (4) have been standardized with respect to the forward focusing and the rearward focusing condition in which the two images are deviated from each other by an amount corresponding to one photoelectric element, but of course the present invention also permits these equations to be standardized with respect to the forward focusing and the rearward focusing condition in which the two images are deviated from each other by an amount corresponding to two or more photoelectric elements. In this case, for example, in order that the equations may be standardized with respect to the forward focusing and the rearward focusing condition in which the two images are deviated from each other by an amount corresponding to two or three photoelectric elements, $I_D$ is obtained with regard not to output difference between adjacent photoelectric elements as already described but to the output difference between every other or every third photoelectric element. As an example, if the number N of the photoelectric elements forming each array is 7 and standardization is effected with respect to the forward focusing and the rearward focusing condition in which the two images are deviated from each other by an amount corresponding to two photoelectric elements, $I_N$ and $I_D$ become as follows:

$$I_N = |x_1 - x_1'| + |x_2 - x_2'| + 2|x_3 - x_3'| + 2|x_4 - x_4'| + 2|x_5 - x_5'| + |x_6 - x_6'| + |x_7 - x_7'|$$

$$I_D = |x_1 - x_3| + |x_2 - x_4| + |x_3 - x_5| + |x_4 - x_6| + |x_5 - x_7| + |x_1' - x_3'| + |x_2' - x_4'| + |x_3' - x_5'| + |x_4' - x_6'| + |x_5' - x_7'|$$

Figure 3:
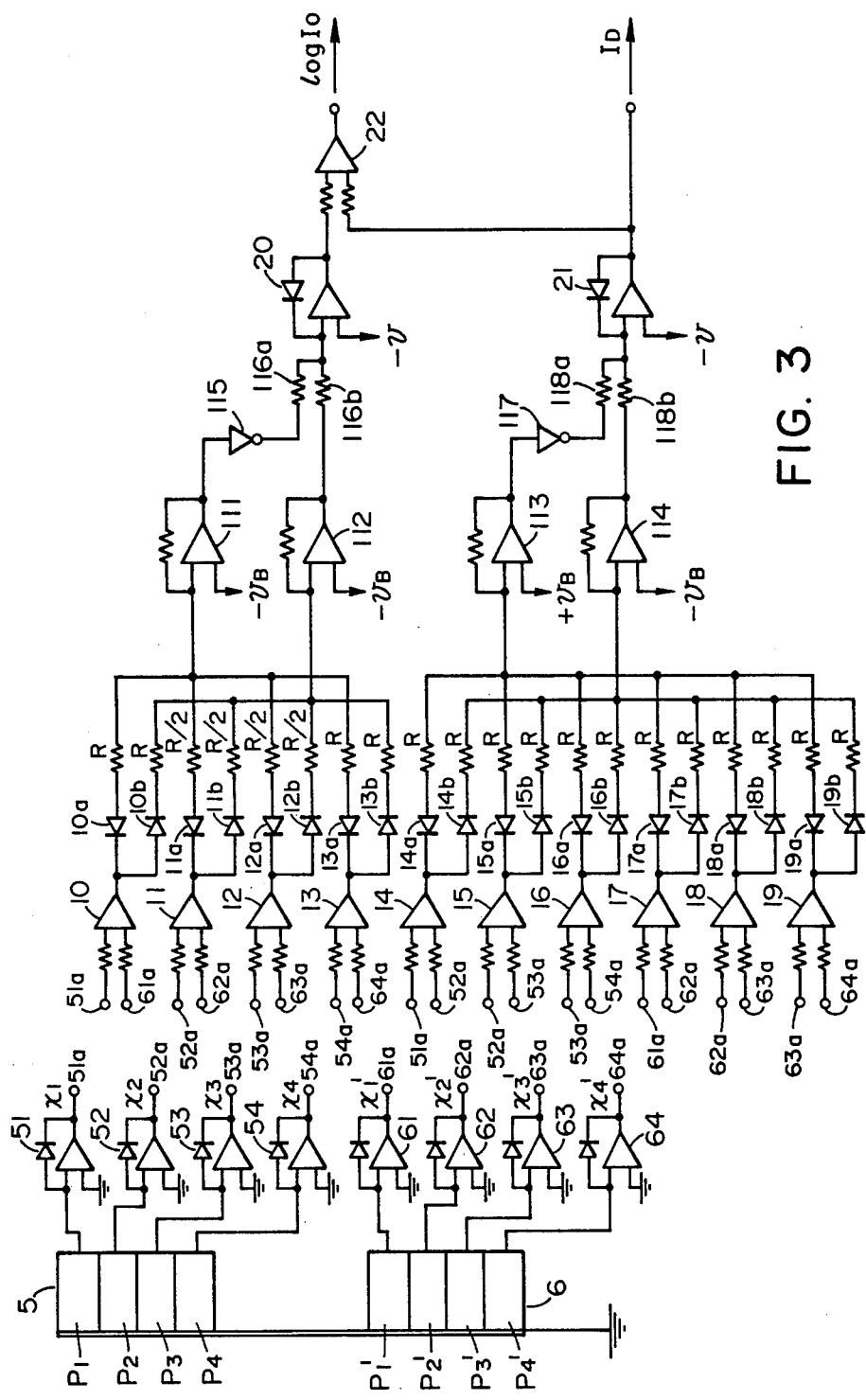
FIG. 3 is a circuit diagram showing an embodiment of the signal processing circuit included in the device of the present invention.

FIG. 3 shows a specific example of the circuit of photoelectric element arrays 5, 6 and the signal processing circuit 7.

The photoelectric outputs of the photoelectric elements $P_1-P_4$ of the array 5 are converted into electrical outputs $x_1-x_4$ proportional to the logarithms of the photoelectric outputs by logarithmic circuits 51, 52, 53 and 54, respectively. The photoelectric outputs of the photoelectric elements $P_1'-P_4'$ of the array 6 are likewise converted into similar electrical outputs $x_1'-x_4'$ by logarithmic circuits 61, 62, 63 and 64, respectively. Differential amplifiers 10-13 calculate the differences $(x_1-x_1')$, $(x_2-x_2')$, $(x_3-x_3')$ and $(x_4-x_4')$, respectively, and differential amplifiers 14-19 calculate the differences $(x_1-x_2)$, $(x_2-x_3)$, $(x_3-x_4)$, $(x_1'-x_2')$, $(x_2'-x_3')$, and $(x_3'-x_4')$, respectively, The output terminals 51a-54a and 61a-64a of the logarithmic circuits are connected to the similarly numbered input terminals 51a-54a and 61a-64a of the differential amplifiers 10-19 by lead wires, but in FIG. 3, the lead wires are not shown for simplicity of illustration. Pairs of diodes 10a, 10b; 11a, 11b; ... 19a, 19b connected in opposite polarities to the output terminals of the differential amplifiers 10-19 are for obtaining the absolute values of said differences. As is apparent from equation (1), a factor 2 is attached to the differences $(x_2-x_2')$ and $(x_3-x_3')$ and therefore, resistors R/2 are connected to the differential amplifiers 11, 12 having calculated these differences, through the diodes 11a, 11b, 12a, 12b, and resistors R having a resistance value double that of said resistors R/2 are connected to the other amplifiers 10, 13-19 through the respective diodes. An operational amplifier 111 adds together the outputs of negative values of the differential amplifiers 10-13, while an operational amplifier 112 adds together the outputs of positive values of the amplifiers 10-13. Likewise, operational amplifiers 113 and 114 respectively add together the outputs of negative and positive values of the differential amplifiers 14-19. The output of the operational amplifier 111 is connected through an inverter 115 and a resistor 116a to the output of the operational amplifier 112 through a resistor 116b and therefore, the correlation $I_N$ appears at the junction between these two resistors 116a and 116b. The outputs of the operational amplifiers 113 and 114 are likewise connected to an inverter 117 and resistors 118a, 118b and therefore, the correlation $I_D$ appears at the junction between the resistors 118a and 118b.

The logarithmic circuits 20 and 21 generate outputs proportional to the logarithms of the correlations $I_N$ and $I_D$, respectively. A differential amplifier 22 calculates the difference between the two logarithmic outputs and generates an output proportional to log $(I_N/I_D)$. Thus, the output of the differential amplifier 22 represents the correlated function $I_O$. Since $I_D$ represents the contrast of the image, this $I_D$ may be utilized when the focused condition is detected by the use of the correlated function $I_O$.

In this circuit example, a logarithmic amplifier is used as the first amplification stage, but for example, photodiode arrays may be used as the photoelectric element arrays and the photoelectric outputs may be time-sequentially read out and these outputs may be held, whereafter an operation similar to what has been described above may be carried out or these time-sequential outputs may be AD-converted and then a similar digital operation may be carried out.

The factor of each term of the right sides of $I_N$ and $I_D$ of equations (3) and (4) has been determined to render the correlated function $I_O$ into 1 in the forward focusing or the rearward focusing condition of a predetermined amount and therefore, for the purpose of rough standardization of $I_O$, the relation between b and c and d of equations (3) and (4), for example, need not be strictly determined as in equation (5) but said factor can be selected considerably arbitrarily.

Also, the correlations $I_N$ and $I_D$ are added by multiplying the absolute value of the difference between the photoelectric outputs of predetermined photoelectric elements or the electrical outputs related thereto by a predetermined factor, but this is for adding together the quantities relating to the magnitude of the difference independently of the plus or minus sign of the difference and therefore, instead of taking the absolute value, the square of each difference, for example, may be multiplied by a predetermined factor to thereby carry out the addition.

The optical system for forming the images of an object on a pair of arrays is not limited to that shown in FIG. 1, but it may be any optical system, including the optical system disclosed in the aforementioned Japanese Laid-open Patent Application No. 39543/1975, which can vary the positional relation between the images on the pair of arrays in accordance with the focused condition of the objective lens.

We claim:

1. A focus detecting device having first and second photoelectric element arrays each including a plurality of photoelectric elements disposed so as to mutually correspond in position, and optical means for forming a first image and a second image of an object on said first and second photoelectric element arrays, respectively, so that when an objective lens is in focused position with respect to the object, the first image and the second image are positioned on said mutually corresponding photoelectric elements of said first and second photoelectric element arrays, respectively, and that when said objective lens is offset from said focused position, the first image and the second image are positioned on the photoelectric elements of said first and second photoelectric element arrays, respectively, which do not mutually correspond, in accordance with said offset, said device being for detecting the focused condition of the objective lens from the positional relations of said first image and said second image with said first and second photoelectric element arrays, respectively, the improvement comprising:

(a) first means for calculating the differences between electrical outputs related to the outputs of the mutually corresponding ones of the photoelectric elements forming said first photoelectric element array and the photoelectric elements forming said second photoelectric element array and adding together the quantities based on said differences;

(b) second means for calculating the difference between each electrical output related to the output of each of said photoelectric elements and each electrical output related to the output of the photoelectric element spaced apart from each said photoelectric element with a predetermined number of photoelectric elements interposed therebetween in the direction of arrangement of the photoelectric elements of said arrays and adding together the quantities based on said differences; and (c) third means for detecting the focused condition of the objective lens on the basis of the outputs of said first means and said second means.

2. The device according to claim 1, wherein said second means calculates the difference between each electrical output related to the output of each of said photoelectric elements and the electrical output related to the output of the photoelectric element adjacent to each said photoelectric element and adds together the quantities based on said differences.

3. The device according to claim 1 or 2, wherein each of said first and second photoelectric element arrays inlcudes n photoelectric elements and, if the electrical outputs of the photoelectric elements of said first photoelectric element array are $x_1$-$x_n$ and the electrical outputs of the photoelectric elements of said second photoelectric element array are $x_1'$-$x_n'$, said first means carries out the operation of $$|x_1 - x_1'| + b|x_2 - x_2'| + \sum_{j=3}^{n-2} c|x_j - x_j'| + b|x_{n-1} - x_{n-1}'| + |x_n - x_n'|$$

and said second means carries out the operation of $$|x_1 - x_2| + \sum_{j=2}^{n-2} d|x_j - x_{j+1}| + |x_{n-1} - x_n| + |x_1' - x_2'| + \sum_{j=2}^{n-2} d|x_j' - x_{j+1}'| + |x_{n-1}' - x_n'|,$$

where b, c and d are different factors.

4. The device according to claim 3, wherein the factors b, c and d in the operations of said first and second means are determined so as to have the relations that $b = 1 + d$ and $c = 2d$.

* * * * *

UNITED STATES PATENT AND TRADEMARK OFFICE
CERTIFICATE OF CORRECTION

PATENT NO. : 4,297,571
DATED : October 27, 1981
INVENTOR(S) : KEN UTAGAWA, ET AL.

It is certified that error appears in the above—identified patent and that said Letters Patent is hereby corrected as shown below:

Column 4, line 11, change "," to --.--.
Column 6, line 49, change "=" to --÷--

Signed and Sealed this

Twenty-sixth Day of January 1982

[SEAL]

Attest:

Attesting Officer

GERALD J. MOSSINGHOFF
Commissioner of Patents and Trademarks